United States Patent
Park

(10) Patent No.: US 9,292,067 B2
(45) Date of Patent: Mar. 22, 2016

(54) SYSTEM AND METHOD FOR MANAGING RECHARGEABLE POWER SOURCES IN A PORTABLE COMPUTING DEVICE WITH TWO OR MORE USAGE MODES

(71) Applicant: QUALCOMM Incorporated, San Diego, CA (US)

(72) Inventor: Hee-Jun Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 321 days.

(21) Appl. No.: 13/909,302

(22) Filed: Jun. 4, 2013

(65) Prior Publication Data

US 2014/0359338 A1    Dec. 4, 2014

(51) Int. Cl.
*G06F 1/26* (2006.01)
*G06F 1/28* (2006.01)

(52) U.S. Cl.
CPC ...... *G06F 1/28* (2013.01); *G06F 1/26* (2013.01)

(58) Field of Classification Search
CPC .......... G06F 1/26; G06F 1/28; Y02B 60/1292
USPC ................................... 713/300, 340
See application file for complete search history.

(56) References Cited

U.S. PATENT DOCUMENTS

| | | |
|---|---|---|
| 2006/0214638 A1 | 9/2006 | Chen et al. |
| 2007/0243852 A1 | 10/2007 | Gibbs |
| 2008/0186086 A1 | 8/2008 | Bell |
| 2010/0023940 A1 | 1/2010 | Iwamatsu et al. |
| 2011/0294456 A1 | 12/2011 | Anderson et al. |
| 2012/0191994 A1 | 7/2012 | Sun |
| 2012/0270602 A1 | 10/2012 | Card |
| 2012/0309344 A1 | 12/2012 | Ferrazzini et al. |
| 2013/0029637 A1 | 1/2013 | Hillier et al. |
| 2014/0066117 A1* | 3/2014 | Egner et al. ............. 455/513 |

FOREIGN PATENT DOCUMENTS

WO    WO 2013/185292    * 12/2013

OTHER PUBLICATIONS

International Search Report and Written Opinion—PCT/US2014/040349—ISA/EPO—Mar. 26, 2015.

* cited by examiner

*Primary Examiner* — Chun Cao
(74) *Attorney, Agent, or Firm* — The Marbury Law Group, PLLC

(57) ABSTRACT

Systems and methods for managing rechargeable power in a portable computing device ("PCD") having two or more usage modes. One embodiment method involves logically dividing a rechargeable power source in the PCD into a first logical power source and a second logical power source. The first logical power source is assigned to a first usage mode. The second logical power source is assigned to a second usage mode. The first and second logical power sources are managed according to the respective first and second usage modes.

60 Claims, 10 Drawing Sheets

SYSTEM AND METHOD FOR MANAGING RECHARGEABLE POWER SOURCES IN A PORTABLE COMPUTING DEVICE WITH TWO OR MORE USAGE MODES

BACKGROUND

Portable computing devices (PCDs), such as mobile phones, have become necessities for individuals on both personal and professional levels. In some instances, individuals may carry two PCDs, one for personal use and another companied-issued PCD intended for corporate use. While this may provide a way to separate personal and corporate use, it is inconvenient and cumbersome to carry and operate multiple devices.

One solution to this problem has been the introduction of dual-subscriber dual-active (DSDA) mobile phones. DSDA mobile phones have full dual modem capability for two SIM cards, which may provide employees with the option to add their personal SIM card to an enterprise phone. DSDA mobile phones have two active modes. Both the personal SIM card and a corporate SIM card may be active all the time to simultaneously support data and voice communications. A dual active mobile phone may perform as follows: a first SIM card may be used in the mobile phone for voice calls while a second SIM card in the same mobile phone may be used for web browsing or other data applications. Each SIM card may always be active, enabling the user to simultaneously receive and transmit data via both SIM cards.

While DSDA phones may enable employees to use a single mobile phone for both corporate and personal usage, these devices are often more expensive and may not provide the level of control desired by the issuing company for separating personal and corporate usages. For example, voice calls and data applications may be used for both personal and corporate usages. Furthermore, by combining both personal and corporate usages into one device that shares the same battery package, battery capacity becomes an even more relevant issue. If an employee uses the mobile phone for too much personal usage, the remaining battery may be insufficient for corporate usage without frequent and inconvenient recharging. This problem may be particularly frustrating to the enterprise providing the mobile phone to employees because it may result in the mobile phone not being available during office hours for required work.

Thus, there is a need in the art for improved mechanisms for managing battery power in a PCD that may be used for both personal usage and corporate usage.

SUMMARY

Systems and methods are disclosed for managing a rechargeable power source, such as a battery, in a portable computing device ("PCD") having two or more usage modes. One embodiment of a method involves logically dividing a rechargeable power source in the PCD into a first logical power source and a second logical power source. The first logical power source may be assigned to a first usage mode. The second logical power source may be assigned to a second usage mode. The first and second logical power sources may be managed according to the respective first and second usage modes.

Another embodiment is a PCD comprising a rechargeable power source and a processor. The processor is operable for logically dividing the rechargeable power source into a first logical power source assigned to a first usage mode and a second logical power source assigned to a second usage mode. The first and second logical power sources may be managed according to the respective first and second usage modes.

BRIEF DESCRIPTION OF THE DRAWINGS

In the drawings, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein may also include files that are not executable in nature, such as documents that may need to be opened or other data files that need to be accessed.

The term "content" may also include files having executable content, such as: object code, scripts, byte code, markup language files, and patches. In addition, "content" referred to herein may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various non-transitory computer readable media having various data structures stored thereon.

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Figure 1:
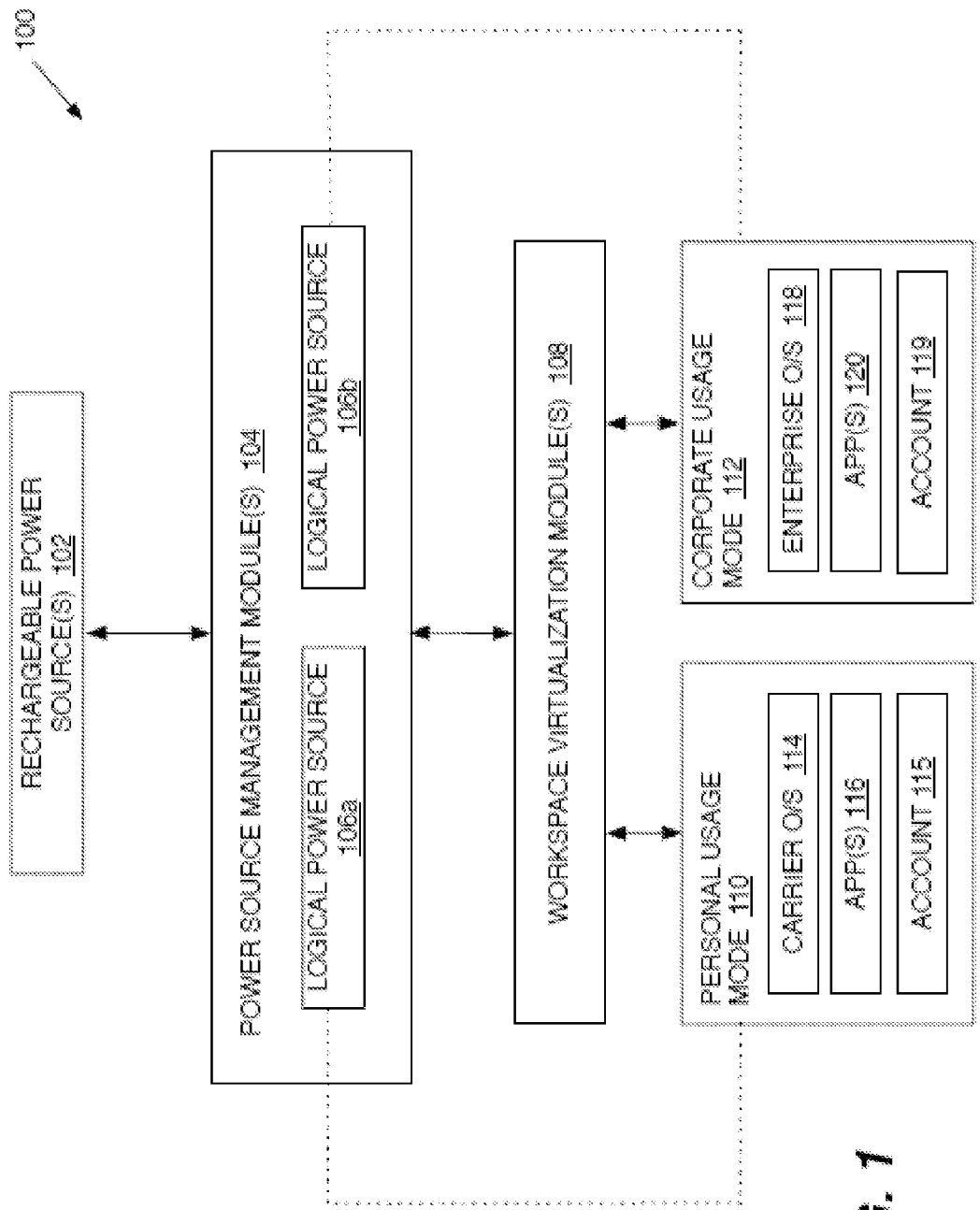
FIG. 1 is a block diagram illustrating an embodiment of a computer system for managing a rechargeable power source in a portable computing device (PCD) having two or more usage modes.

FIG. 1 illustrates a computer system 100 for managing rechargeable power in a PCD that supports two or more usage modes. The rechargeable power for the PCD may be provided by rechargeable power source(s) 102, such as a battery package comprising one or more rechargeable battery cells, capacitors, or a combination thereof. As illustrated in FIG. 1, the usage modes may be provided and controlled by workspace virtualization module(s) 108, which may provide separate desktop workspaces, software domains, personas, etc. for different types or categories of user experiences or usage modes. A first usage mode may comprise a personal usage mode 110 that is configured for non-corporate or personal uses. A second usage mode may comprise a corporate usage mode 112 that is configured for corporate uses. For example, a company or enterprise may issue the PCD to an employee and use the personal usage mode 110 and the corporate usage mode 112 to customize corresponding user experiences. One or more aspects of each user mode may be controlled by the enterprise and/or the user of the PCD and enforced by the workspace virtualization module(s) 108.

As further illustrated in FIG. 1, each user mode may support a different operating system, user account(s), and one or applications. The personal usage mode 110 may be provided via, for example, a carrier operating system 114 or an account 115 with one or more applications 116 specified for personal use. The corporate usage mode 112 may be provided via, for example, an enterprise operating system 118 or an account 119 with one or more applications 120 specified for corporate use. It should be appreciated, however, that the PCD may not necessarily support two different operating systems. Further, some applications may be available in both usage modes. One of ordinary skill in the art will appreciate that the designation of personal versus corporate applications may vary according to enterprise policies, user preferences, and the configuration of the virtualization software.

In an exemplary implementation, the personal applications 116 may comprise a browser, social networking applications, multimedia players, games, websites designated as being of a personal nature, other personal applications, to name a few examples. The corporate applications 120 may comprise an email application, a customer relationship manager (CRM) application, a VPN client, videoconferencing applications, or any other software categorized or intended for corporate use. Phone calls may be categorized as either personal or corporate usages or appropriately designated, on a call-by-call basis according to a contacts database.

Referring again to FIG. 1, the computer system 100 comprises power source management module(s) 104 for managing power resources associated with one or more rechargeable power sources 102. In general, the power source management module(s) 104 logically divides the rechargeable power source(s) 102 into two or more logical power sources assigned to the usage modes supported by the PCD. In the example of FIG. 1, the rechargeable power source(s) 102 may be logically divided into a first logical power source 106a and a second logical power source 106b. The first logical power source 106a is assigned to the personal usage mode 110, and the second logical power source 106b is assigned to the corporate usage mode 112. During operation of the PCD in the personal usage mode 110 and the corporate usage mode 112, the power source management module(s) 104 detect and attribute power consumption to the logical power sources 106a and 106b, respectively.

Figure 2:
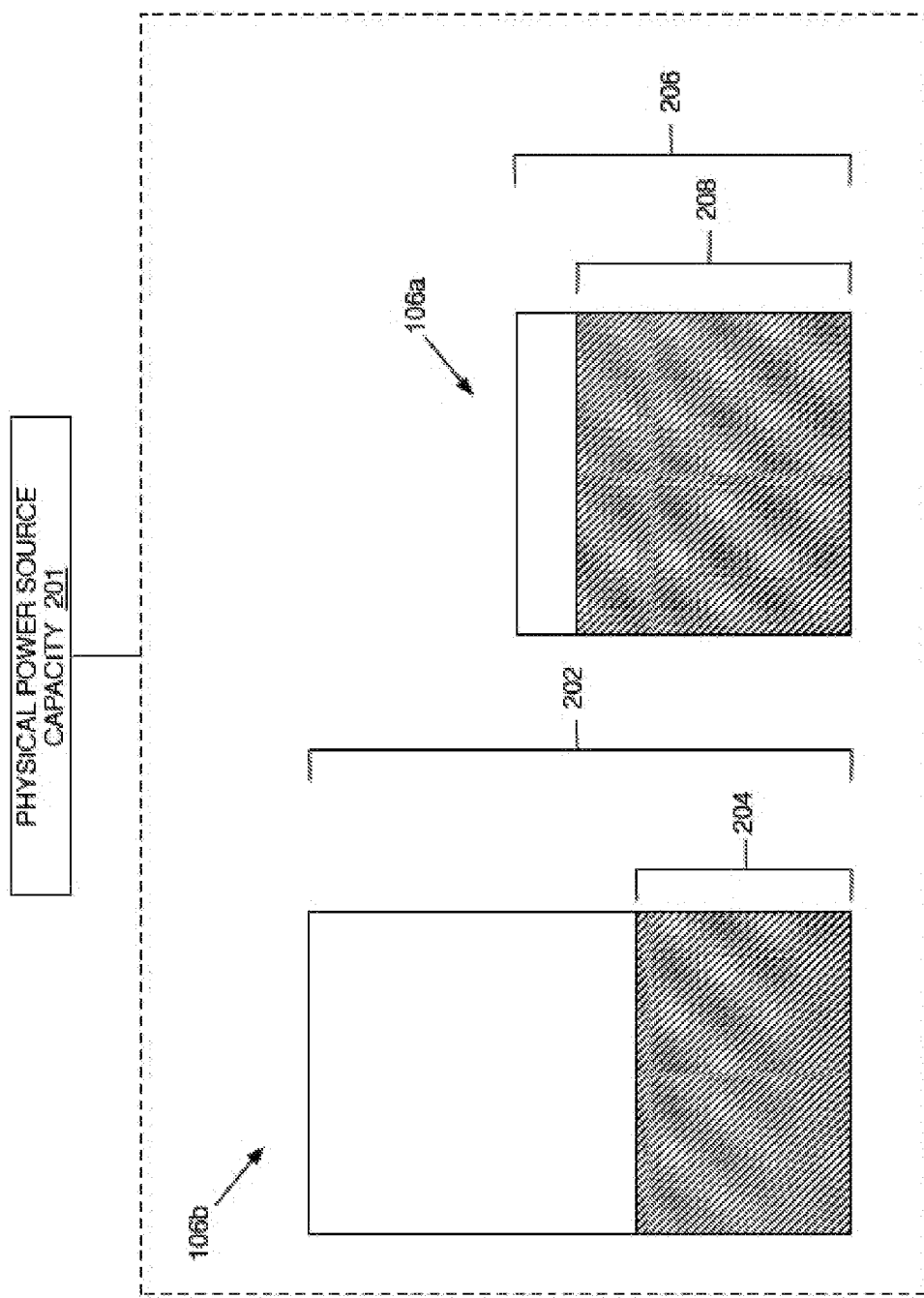
FIG. 2 is schematic diagram illustrating an embodiment of a data structure for managing two or more logical power sources associated with a rechargeable power source in a PCD.

In this regard, as illustrated in FIG. 2 the power source management module(s) 104 logically map the physical power source capacity 201 of rechargeable power source(s) 102 to the logical power sources 106a and 106b. The logical power source 106b may comprise a logical corporate power source capacity 202 allocated for the corporate usage mode 112 and a remaining logical corporate power source capacity 204. The logical power source 106a may comprise a logical personal power source capacity 206 allocated for the personal usage mode 110 and a remaining logical personal power source capacity 208. In one embodiment, the logical power sources 106a and 106b may be budgeted and managed according to the Equations 1-4:

PowerSourceRemaining_physical (mAh or mWh)
=remaining logical corporate power source
capacity 204+remaining logical personal power
source capacity 208　　　　　　　　　　　　Equation 1

Logical corporate power source capacity 202 (mAh or
mWh)=TargetPowerSourceLife_corporateUsage
(hours:minutes)*AveragePowerConsumption-
_corporateUsage (mA or mW)　　　　　　　Equation 2

Logical personal power source capacity 206 (mAh or
mWh)=PowerSource_fullChargeCapacity—
Logical corporate power source capacity 202
(mAh or mWh)　　　　　　　　　　　　　　Equation 3

PowerSource_fullChargeCapacity (mAh or mWh)
=Logical corporate power source capacity 202+
Logical personal power source capacity 206　Equation 4

Figure 3:
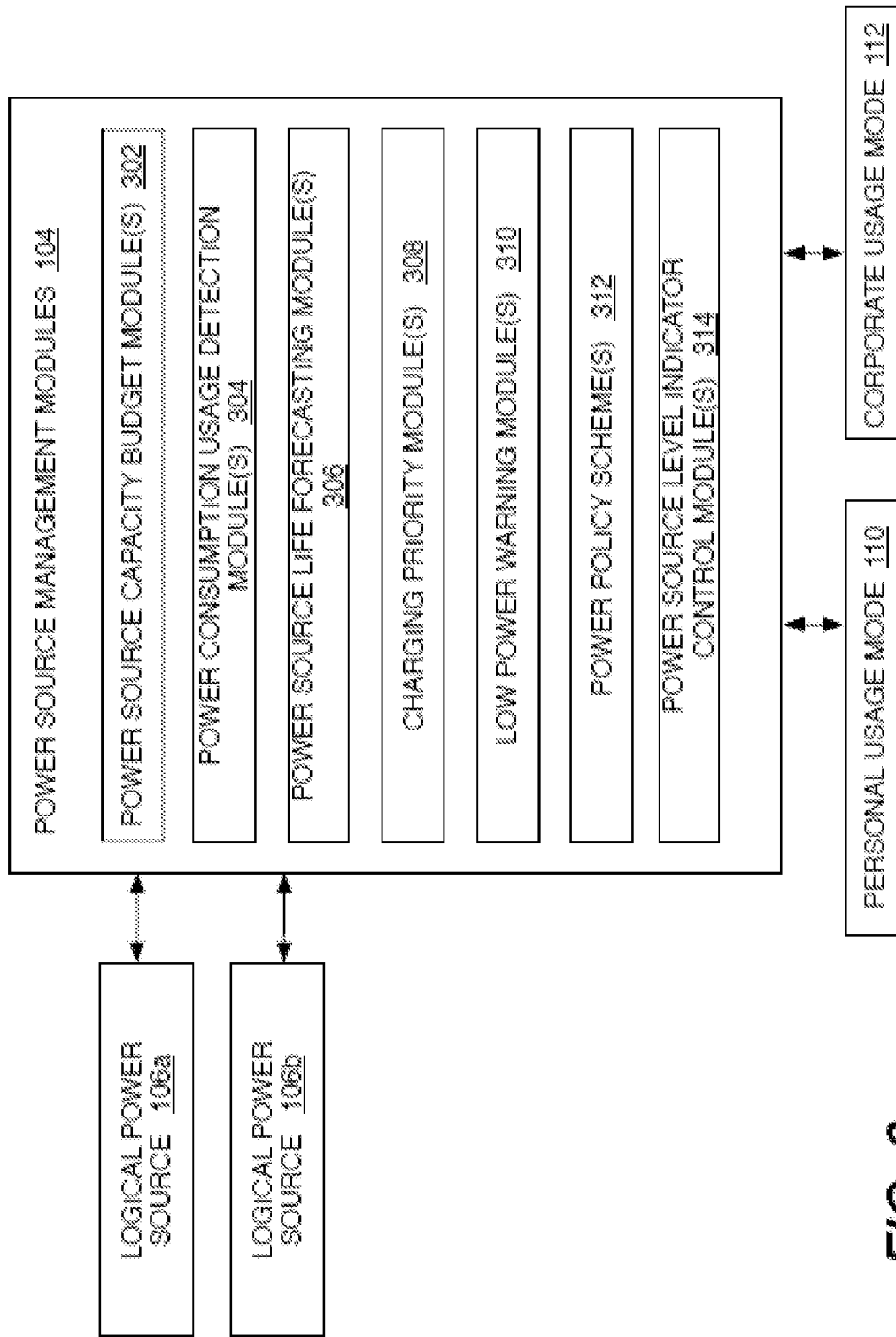
FIG. 3 is a block diagram illustrating an embodiment of various power source management modules for managing the logical power sources illustrated in FIG. 1.

FIG. 3 illustrates an exemplary embodiment of various modules for managing the logical power sources 106a and 106b. The modules may be embodied in software and/or hardware, as illustrated in the exemplary PCD of FIG. 8. Power source capacity budget module(s) 302 separate and budget the logical power sources for each usage mode from the other. Power source capacity budget module(s) 302 may perform intelligent power source budgeting based on corporate and/or personal (c/p) mode user profiles stored in a memory within the PCD. In cases where the PCD is owned by an employer or otherwise issued to an employee, power source capacity budget module(s) 302 may be configured to secure an employer-configured amount of power source budget for the corporate usage mode 112. The variables illustrated in FIG. 2 and included in Equations 1-4 may be calculated by power source capacity budget module(s) 302. Any of these or other variables may be defined, calculated, and/or adjusted according to data or algorithms stored in the PCD or otherwise accessible to the PCD via a communication network. For example, the logical corporate power source capacity 202 may comprise a first value during work hours and a second lesser value on certain days, weekends, or time periods when office hours are scheduled to be reduced. In this regard, the power source capacity budget module(s) 302 may interface with, for example, a user's calendar, time card data, or a company calendar stored on the PCD or a company server.

Power consumption/usage detection module(s) 304 generally comprise functionality for detecting power consumption associated with the usage modes 110 and 112 and updating the corresponding logical power sources 106a and 106b. One of ordinary skill in the art will appreciate that various schemes, policies, and algorithms may be used to detect corporate usage versus personal usage. Power consumption/usage detection module(s) 304 may cooperate with the workspace virtualization module(s) 108. If the PCD comprises a DSDA mobile phone comprising dual SIM cards, usage detection between the corporate usage mode 112 and the personal usage mode 110 may be based on SIM activity. A standby state may be used to determine when one of two SIM cards is selected and being used. Voice and/or data calls may be used to detect which SIM card is being used for a call set-up. For dual SIM active scenarios, such as dual-standby, voice call set-ups detected on both SIM cards (or one data session on one SIM card and one voice call session on the other SIM card) may be allocated for personal and corporate usage. For implementations using heterogeneous models and networks, different power models may be used.

Usage detection may also be based on the applications. Applications 116 may be allocated to the personal usage mode 110 and applications 120 may be allocated to the corporate usage mode 112. In other embodiments, any non-network-aware applications may consume the remaining logical personal capacity 208. If a VPN is connected, all usages may consume the remaining logical corporate power source capacity 204.

Usage detection may be further based on user settings and/or enterprise settings. For example, the user of the PCD or the enterprise may control working/office hours during which usages are allocated to the corporate usage mode 112.

Power consumption and/or usage detection may be based on the GPS location of the PCD. Power consumption/usage detection module(s) 304 may request location data from a GPS transceiver. If the user is at the office or another location associated with work-related functions, corporate usage may be assumed.

Power consumption/usage detection module(s) 304 may be configured to calculate separate average power source consumption rates for corporate and personal usages based on estimates or actual measurements. Average power source consumption rates may be based on power models or power policy scheme(s) 312. Actual measurements of power source consumption rates may be made using electrical current sensors 157b, an electrical current manager module, and/or power source management module 104 described below with reference to FIG. 8. In DSDA embodiments having heterogeneous modems, different modem power models may be used.

Power source life forecasting module(s) 306 may be configured to retrieve local or remote data to predict corporate and/or personal usage. For example, scheduled phone calls, online meetings, etc. may be identified by accessing a calendar application to forecast, for example, the remaining office hours in the day. Power source life forecasting module(s) 306 may be configured to forecast required power source budgets for corporate and personal usages by determining average power consumption rates*expected time remaining per usage plus predetermined margins. Power source life forecasting module(s) 306 may determine whether calculations for work use are longer than power source life forecasted. Power source life forecasting module(s) 306 may support user and/or enterprise settings for purposes of forecasting.

Low power warning module(s) 310 may be configured to re-allocate logical power source budgets under predefined low power conditions. The PCD may be shut down during personal usage to conserve power source capacity for corporate usage, or the personal usage mode 110 may be limited to minimal features. In low power conditions, low power warning module(s) 310 may be configured to discontinue LTE mode, eliminate multimedia functions, web browsing, etc. Low power warning module(s) 310 may apply different power/performance policies (e.g., power policy schemes 312) for the personal usage mode 110 and the corporate usage mode 112. Low power warning module(s) 310 may be configured to enforce a relatively lower power policy for the personal usage mode 110.

Charging priority module(s) 308 may support intelligent charging priority. For example, the logical power source 106b may be charged first (or relatively more) during or before office hours. The logical power source 106a may be charged first (or relatively more) after office hours or based on power policy schemes 312.

Figure 7A:
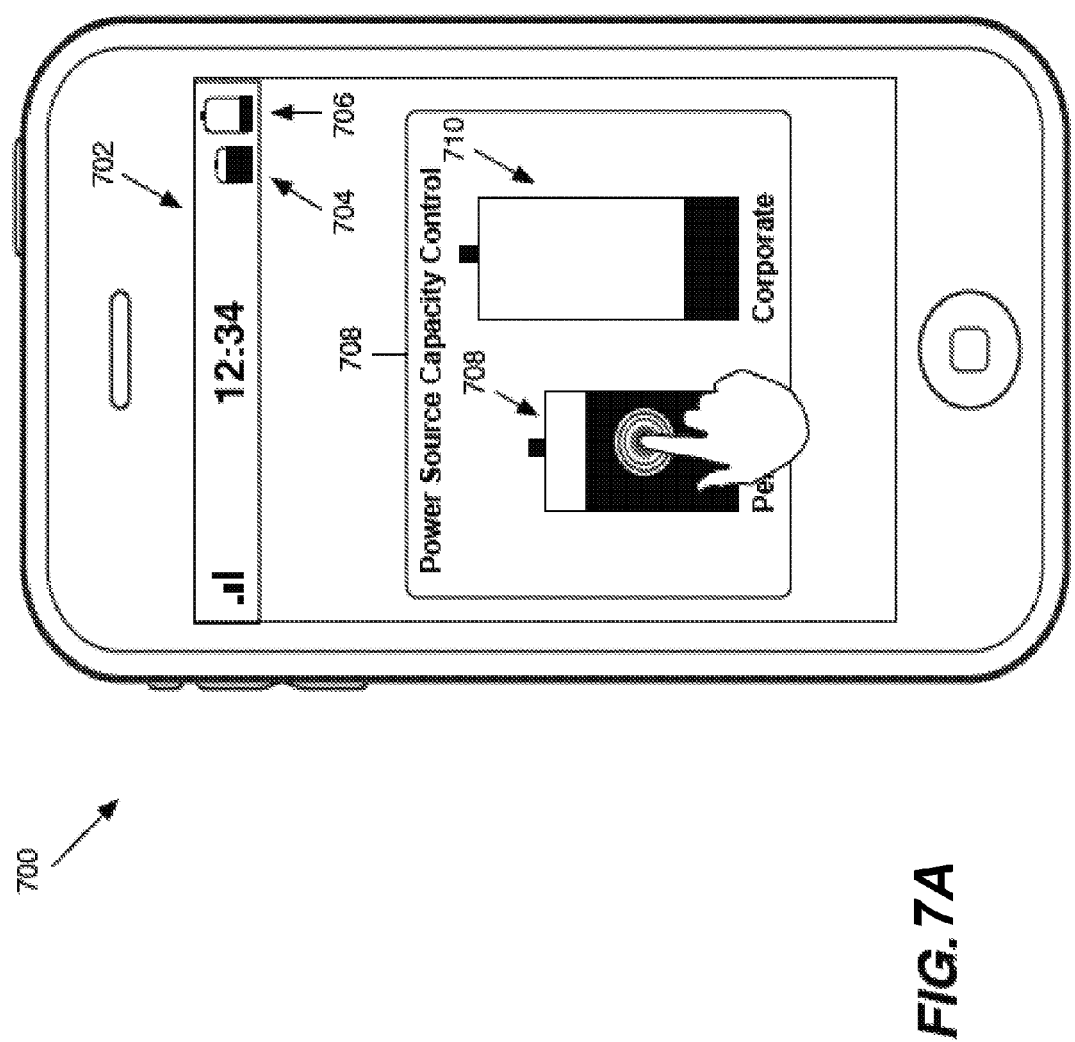
FIG. 7A illustrates an embodiment user interface screen displayed on a display device of a PCD for selectively controlling logical power source capacity allocated to a personal usage mode and a corporate usage mode.
Figure 7B:
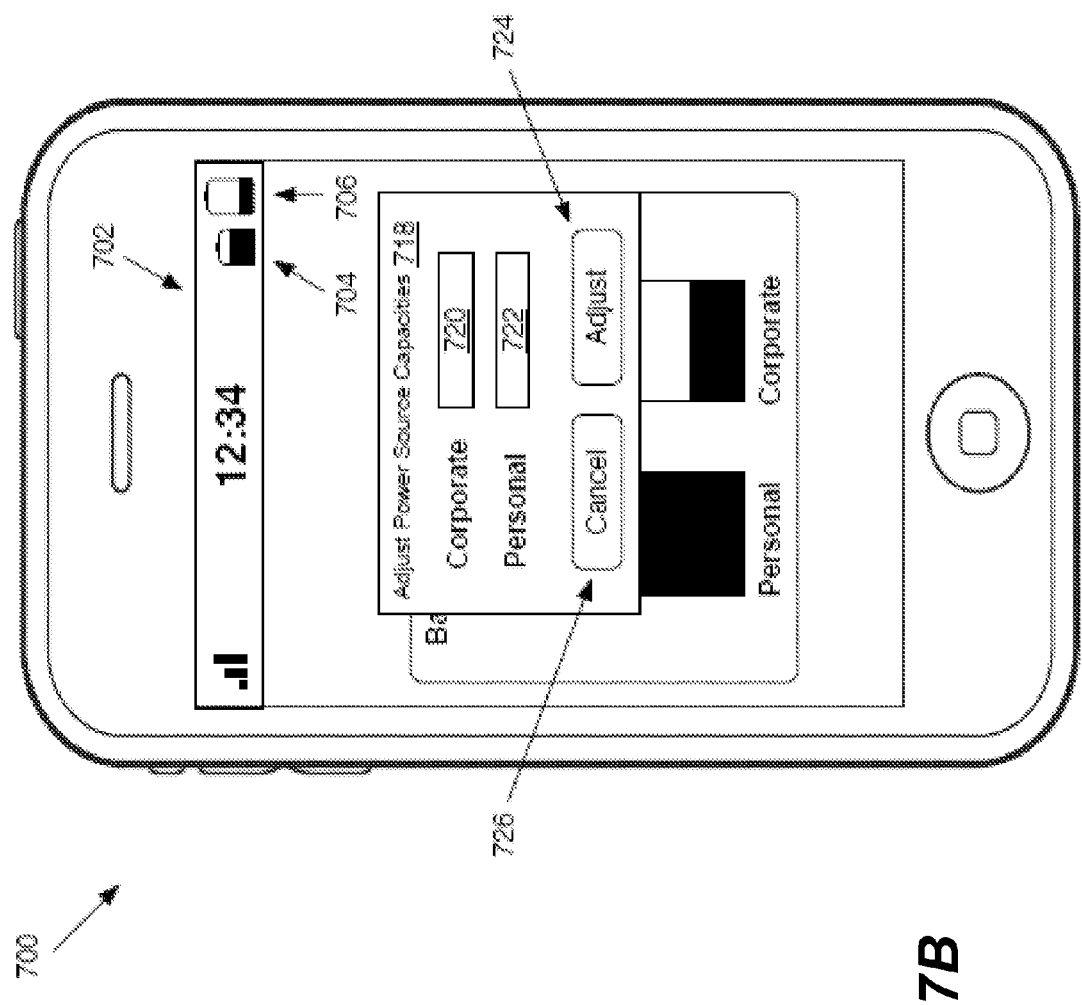
FIG. 7B illustrates another user interface screen shot of an embodiment for adjusting the logical power source capacities allocated to the personal usage mode and the corporate usage mode.
Figure 7C:
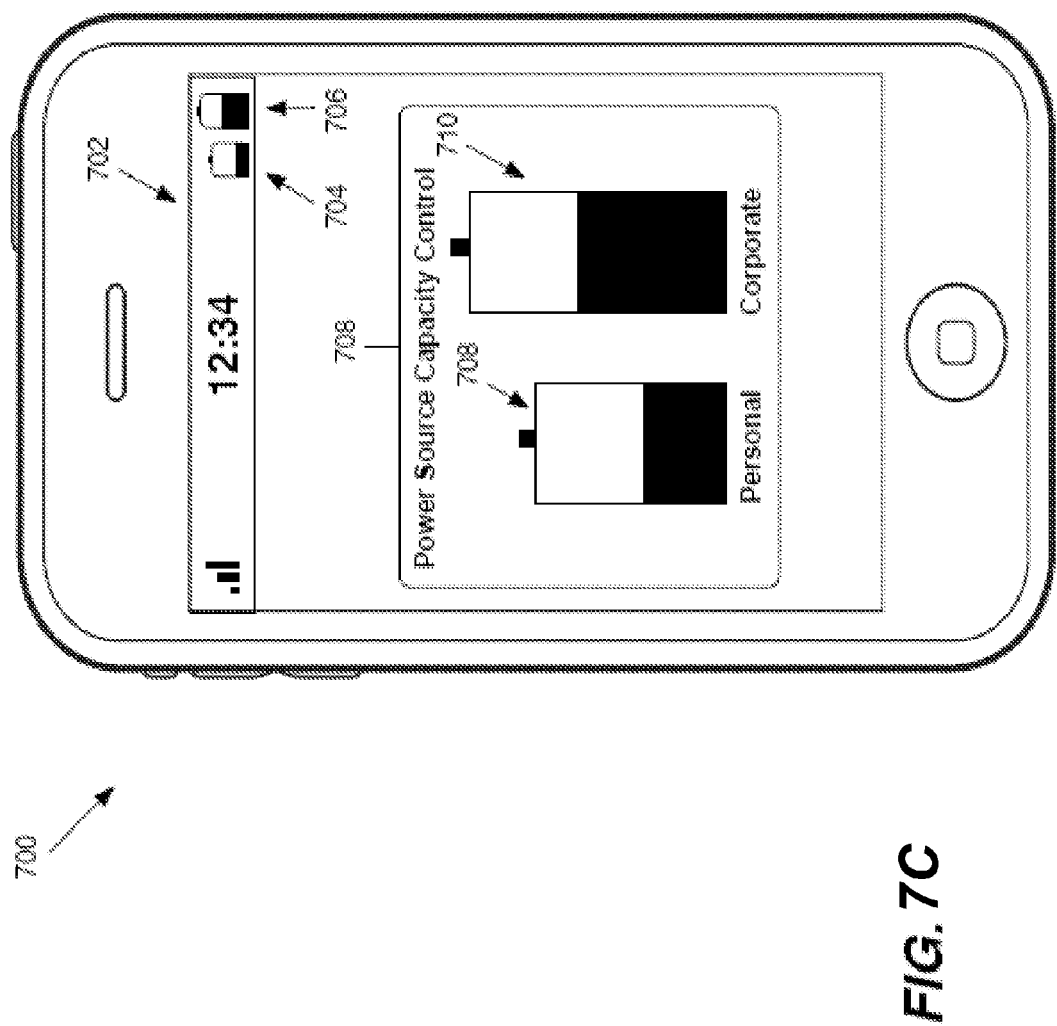
FIG. 7C illustrates the user interface screen of FIG. 7B after the logical power source capacities have been adjusted by a user.

As illustrated in FIGS. 7A-7C, power source level indicator control module(s) 314 may be configured to display on a display 700 via a graphical user interface a power source level indicator. The power source level indicator may comprise separate icons 704 and 706 displayed in a display portion 702. The display portion 702 may comprise a pull-down notifications menu, a persistent display, or a portion of a lock screen. Icon 704 may display the logical power source 106a allocated for personal usage with a visual indication of the remaining logical personal power source capacity 208. Icon 706 may display the logical power source 106b allocated for corporate usage with a visual indication of the remaining logical corporate power source capacity 204. The relative size of the icons 704 and 706 may approximate the relative size of the logical corporate power source capacity 202 and the logical personal power source capacity 206.

A user of the PCD may also launch a power source capacity control screen 708. Screen 708 may be launched, for example, from an applications menu or by selecting the icons 704 or 706. The power source capacity control screen 708 may display larger icons 708 and 710 corresponding to the smaller icons 704 and 706, respectively. The power source capacity control screen 708 may enable the user of the PCD to selectively adjust the relative sizes of the logical corporate power source capacity 202 and the logical personal power source capacity 206 or re-allocate available capacity between the remaining logical personal power source capacity 208 and the remaining logical corporate power source capacity 204. In the embodiment illustrated in FIG. 7A, the remaining logical corporate power source capacity 204 may be running low with a surplus of capacity available for personal usage. If the user anticipates a need for substantial corporate usage, the user may select the icon 708 to initiate a re-allocation of available capacity from the logical power source 106*a* to the logical power source 106*b*. Other user commands may be used.

In response to the user command (FIG. 7B), a screen 718 may be displayed for enabling the user to re-allocate available capacity for either corporate usage (component 720) or personal usage (component 722). The screen 718 may include a button 726 for canceling the re-allocation and a button 724 for initiating the re-allocation. FIG. 7*c* illustrates the power source capacity control screen 708 with updated icons 708 and 710 to reflect the re-allocation.

Figure 4:
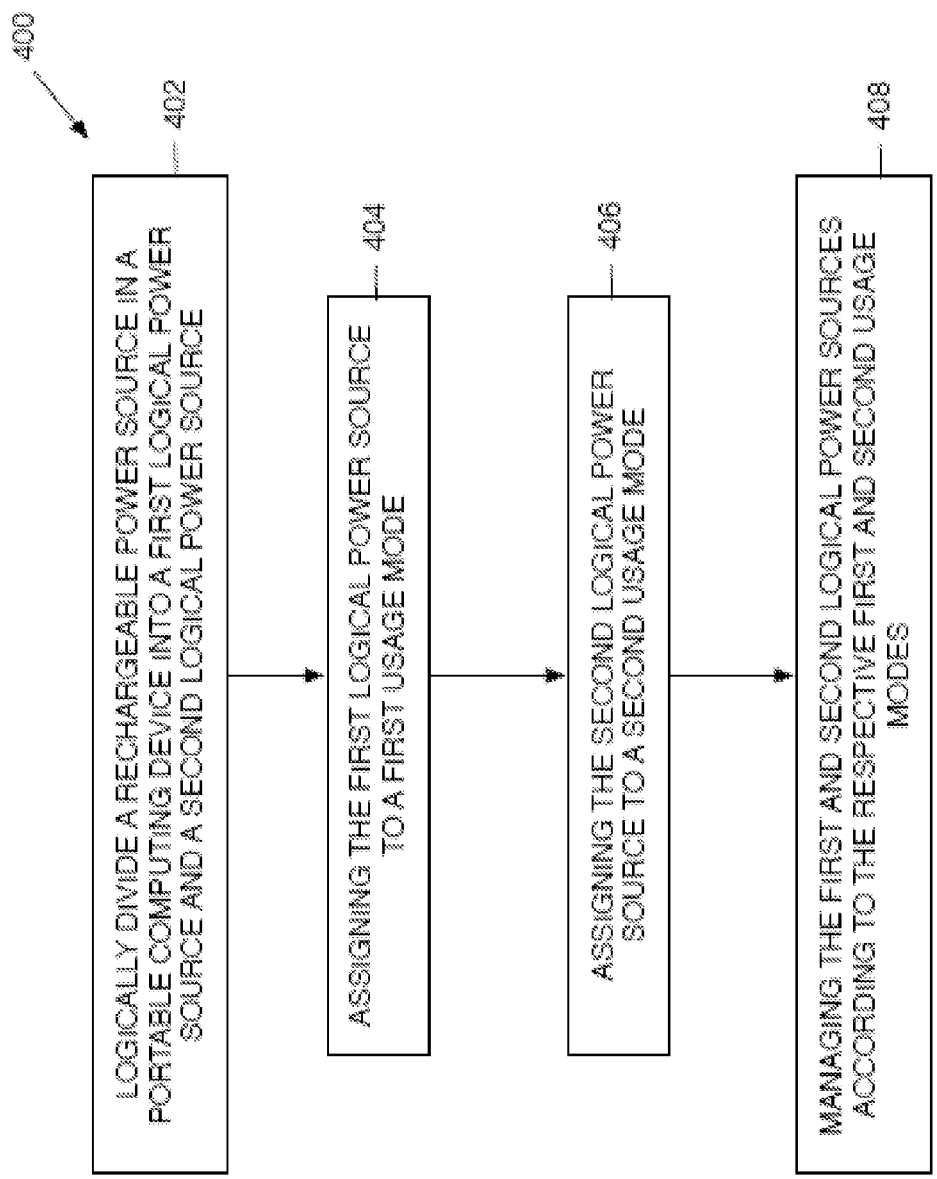
FIG. 4 is a flowchart illustrating an embodiment method for managing a rechargeable power source in a PCD having two or more usage modes.

FIG. 4 illustrates an embodiment method 400 for managing rechargeable power in a PCD having two or more usage modes. At block 402, the rechargeable power source 102 is logically divided into a first logical power source 106*a* and a second logical power source 106*b*. The first logical power source 106*a* may be assigned to a first usage mode (block 404). The second logical power source 106*b* may be assigned to a second usage mode (block 406). In an embodiment, the first and second usage modes comprise the personal usage mode 110 and the corporate usage mode 112 supported by the workspace virtualization module(s) 108. In additional embodiments, the assignment of the first and second usage modes to the logical power sources 106*a* and 106*b* may involve any of the power source management modules 104 described above. It should be appreciated that the assignment may be implemented by one or more of the power source capacity budget modules 302, the power consumption/usage detection modules 304, the power source life forecasting modules 306, and the workspace virtualization modules 108. At block 408, the first and second logical power sources 106*a* and 106*b* are managed according to the respective first and second usage modes. In other words, usage attributed to the first usage mode (e.g., personal usage) is logically consumed from the first logical power source 106*a* and usage attributed to the second usage mode (e.g., corporate usage) is logically consumed from the second logical power source 106*b*.

Figure 5:
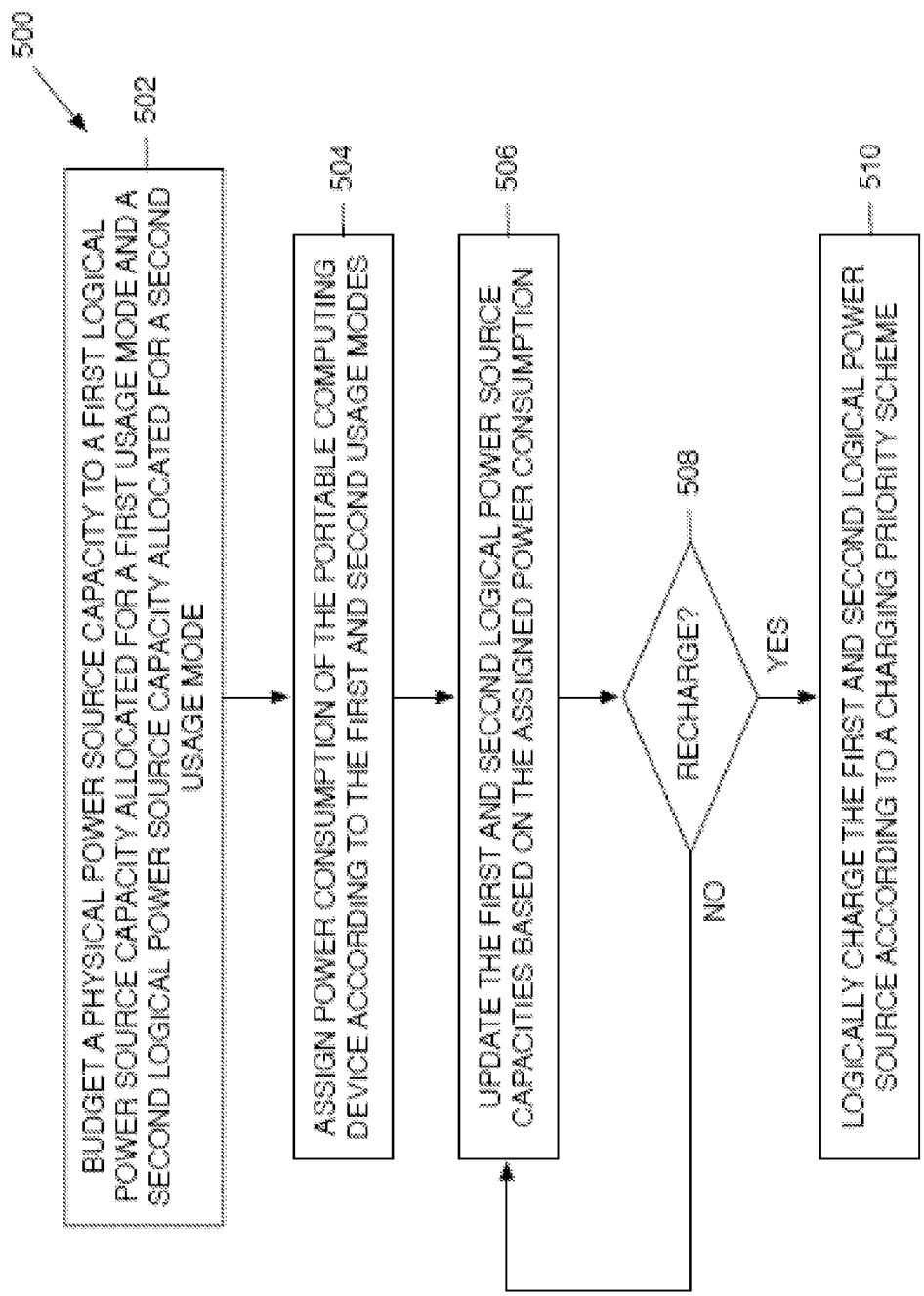
FIG. 5 is a flowchart illustrating another embodiment method for managing a rechargeable power source in a PCD having two or more usage modes.

FIG. 5 illustrates another embodiment method 500 for managing rechargeable power in a PCD having two or more usage modes. At block 502, a physical power source capacity 201 (FIG. 2) is budgeted for two or more usage modes. A first usage mode (e.g., personal usage mode 110) is allocated to a first logical power source capacity (e.g., remaining logical personal power source capacity 208). A second usage mode (e.g., corporate usage mode 112) is allocated to a second logical power source capacity (e.g., remaining logical corporate power source capacity 204). At block 504, power consumption of the PCD is assigned according to the first and second usage modes and logically consumed from the corresponding logical power source capacities. As described above, the power consumption may be forecasted, specified by the user and/or the enterprise, defined by user or system settings or usage profiles, determined according to the workspace virtualization modules 108, measured by electrical current sensors 157*b* and averaged, or otherwise assigned. At block 506, during operation of the PCD, the first and second logical power source capacities are updated based on the assigned power consumption. In other words, power consumption assigned to the first usage mode is logically consumed (i.e. deducted) from the first logical power source capacity, and power consumption assigned to the second usage mode is logically consumed (i.e. deducted) from the second logical power source capacity. When the PCD is recharged (decision block 508), the corresponding logical power sources 106*a* and 106*b* may be logically charged (i.e. deducted), via the charging priority modules 308, according to one or more priority scheme(s).

Figure 6:
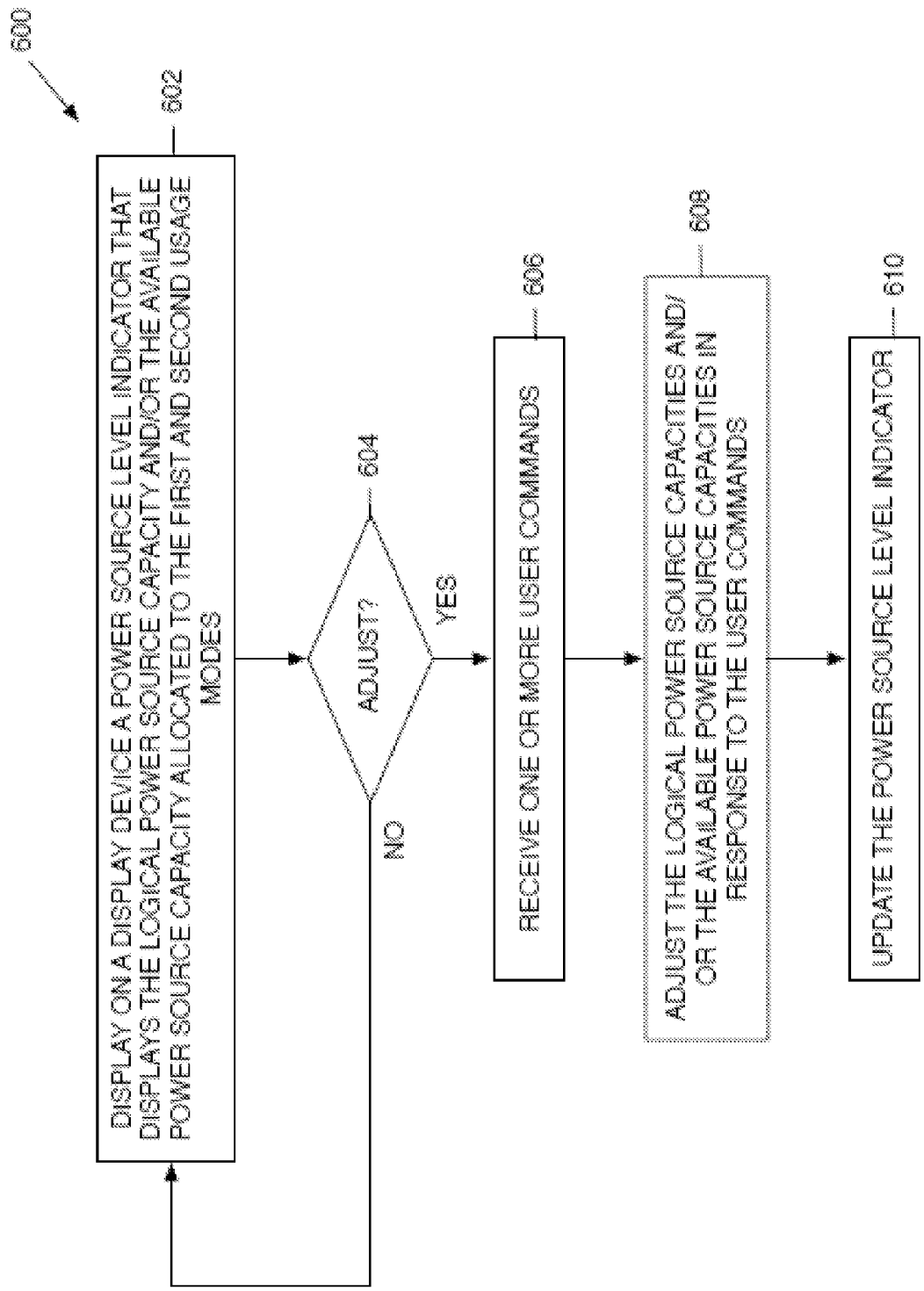
FIG. 6 is a flowchart illustrating an embodiment method for selectively adjusting logical power sources allocated to two or more usage modes in a PCD.

FIG. 6 is a flowchart illustrating an embodiment method for selectively adjusting capacities of the logical power sources 106*a* and 106*b*. At block 602, a power source level indicator may be displayed on a display device. The power source level indicator may comprise separate icons 704 and 706 displayed in a display portion 702 or separate icons 708 and 710 displayed in the power source capacity control screen 708. The power source level indicator may be configured for enabling the user to selectively adjust or re-allocate capacities for the logical power sources 106*a* and 106*b* (decision block 604). At block 606, one or more user commands may be received by, for example, the power source management module(s) 104, as illustrated in FIGS. 7A and 7B. At block 608, the logical power source capacities and/or the remaining power source capacities may be adjusted in response to the user commands. At block 610 and as illustrated in FIG. 7C, the power source level indicator may be updated to reflect the user-specified adjustment or re-allocation.

Figure 8:
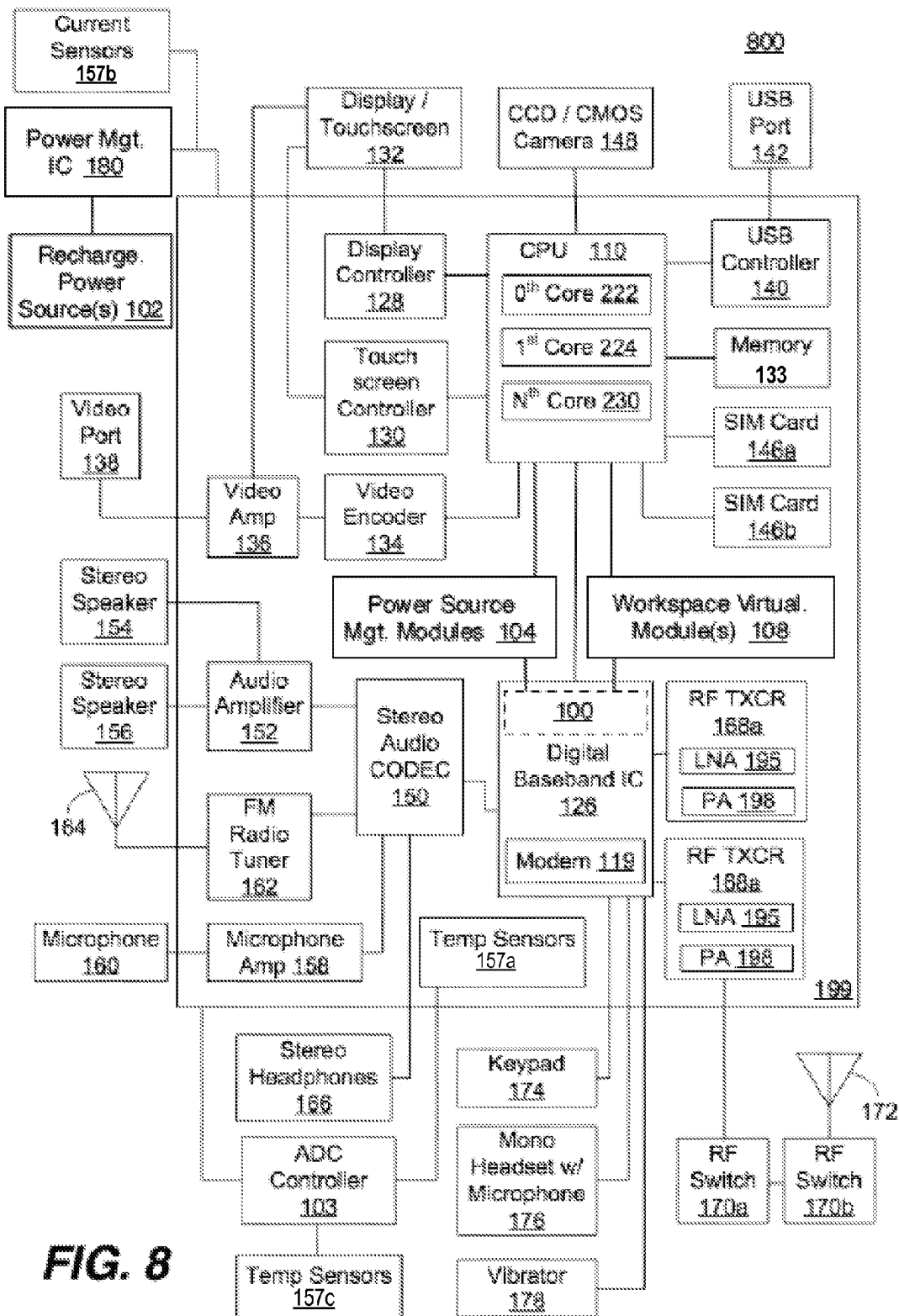
FIG. 8 is a functional block diagram of an exemplary, non-limiting embodiment of a PCD in the form of a wireless telephone suitable for implementing embodiment methods for managing a rechargeable power source within the PCD.

FIG. 8 is a functional block diagram illustrating an exemplary embodiment of a portable computing device ("PCD") 100 that may incorporate the computing system 100 (FIG. 1) and methods (FIG. 4-6) for managing rechargeable power. The workspace virtualization module(s) 108 and the power source management modules 104 may be embodied in a memory or a processor as software code (e.g., CPU 110 or digital baseband IC 126).

As can be seen in the exemplary illustration of FIG. 8, a power management IC ("PMIC") 180 monitors and controls power supplied by one or more rechargeable power source(s) for hardware elements residing within the integrated circuit ("IC") 199. One or more electrical current sensors 157B are configured to monitor power rails (not illustrated) and generate a signal indicative of electrical current consumption by the particular component(s) associated with power rails (not illustrated) which feed each of the hardware elements within IC 199. One or more electrical current sensors 157*b* may be positioned on the IC 199 and/or adjacent to the IC 199.

It is envisioned that the electrical current sensors 157*b* may be configured to monitor electrical current and be of a type such as, but not limited to, a Hall effect type for measuring the electromagnetic field generated by electrical current flowing through a power rail, a shunt resistor current measurement type for calculating electrical current from voltage drop measured across the sense resistor in the power rail, or any type known to one of ordinary skill in the art. As such, while the particular design, type or configuration of a electrical current sensor 157*b* that may be used in an embodiment of the systems and methods may be novel in, and of, itself, the systems and methods are not limited to any particular type of electrical current sensor 157*b*.

Other sensors, such as temperature sensors 157*a* and 157*c* may be configured for measuring temperature at or near a processing component, the measurement of which may also be used to deduce power consumption by a given component.

As shown, the PCD 800 includes an on-chip system 199 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of or in addition to a CPU 110, a digital signal processor ("DSP") may also be employed as understood by one of ordinary skill in the art.

Modules may be provided for monitoring electrical current within PCD 800, predicting impacts on battery loads and applying electrical current load management techniques to help the PCD 800 optimize its power supply and maintain a high level of functionality. These modules may communicate with multiple operational sensors (e.g., electrical current sensors 157b, temperature sensors 157a, 157c and hardware elements) distributed throughout the on-chip system 199 and with the CPU 110 of the PCD 800. In some exemplary embodiments, an electrical current (EC) manager module may monitor electrical current sensors 157b for current consumption rates uniquely associated with the cores 222, 224, 230 and transmit the current consumption data to a database (which may reside in memory 112). The EC manager module may identify use case conditions of the PCD 800 that may warrant application of one or more electrical current load management techniques to specific hardware elements within chip 199.

As illustrated in FIG. 1, a display controller 128 and a touch screen controller 128 are coupled to the CPU 110. A touch screen display 132 external to the on-chip system 199 is coupled to the display controller 128 and the touch screen controller 130. The EC manager module may monitor workload queues for the cores 222, 224, 230, for example, and work with the PMIC 180 to manage power provided to the cores from rechargeable power source(s) 102. The EC manager module may monitor electrical current measurements on power rails from the PMIC 180 to components of the on-chip system 199 and calculate present levels of electrical draw on the rechargeable power source(s) 102, that may comprise a single battery, a capacitor, and/or combination thereof, and/or an electrical charger for the battery. Advantageously, by quantifying present levels of electrical current loads the EC manager module and/or a communications power (CP) manager module may predict electrical current drawn on the rechargeable power source(s) 102 resulting from requests for additional functionality/workloads from one or more hardware elements within PCD 800.

A PCD 800 may further include a video encoder 134, such as a phase-alternating line ("PAL") encoder, a sequential couleur avec memoire ("SECAM") encoder, a national television system(s) committee ("NTSC") encoder or any other type of video encoder 134. The video encoder 134 is coupled to the CPU 110. A video amplifier 136 is coupled to the video encoder 134 and the touch screen display 132. A video port 138 is coupled to the video amplifier 136. As depicted in FIG. 8, a universal serial bus ("USB") controller 140 is coupled to the CPU 110. Also, a USB port 142 is coupled to the USB controller 140. A memory 112a and a pair of subscriber identity module ("SIM") cards 146a, 146b may also be coupled to the CPU 110. The two SIM cards 146a, 146b may support DSDA communications as described above and as understood by one of ordinary skill in the art. While only two SIM cards 146 are illustrated, one of ordinary skill in the art recognizes that more than two SIM cards 146 may be supported by the PCD 800. Furthermore, it should be appreciated that the PCD 800 may support non-DSDA embodiments with only a single SIM card. A graphical processing unit 182 may also be coupled to the CPU 110 for supporting graphics and program applications displayed on the touchscreen 132.

Further, as shown in FIG. 8, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 8, a stereo audio CODEC 150 may be coupled to a digital baseband integrated circuit ("IC") 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 8 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

The digital baseband IC 126 may comprise a modem 119 and another processor (not illustrated). A CP manager module may be coupled to the modem 119. The CP manager instead of being a separate hardware element relative to the IC 126 may be part of the IC 126 as understood by one of ordinary skill in the art and as indicated with the dashed lines within the IC 126. The digital baseband IC 126 may further comprise an analog-to-digital converter ("ADC"), a receive channel, a transmit channel, and a digital-to-analog converter ("DAC") as understood by one of ordinary skill in the art.

The receive channel (baseband receive hardware) and transmit channel of the digital baseband IC 126 may comprise a plurality of Wireless Communication System Modem Sub-Circuits ("WCSMSCs") as understood by one of ordinary skill in the art. These WCSMCs may form part of or all of the modem 119.

Modem 119 may comprise a single hardware device. In alternate exemplary embodiments, two different modems 119 may be employed within the PCD 800. One of ordinary skill in the art recognizes that a single modem design typically conserves more electronic packaging space/area compared to the dual modem. The single modem design is usually more compact relative to the dual modem design.

The modem 119 may support global system for mobile communications ("GSM"), code division multiple access ("CDMA"), wideband code division multiple access ("W-CDMA"), time division synchronous code division multiple access ("TDSCDMA"), long term evolution ("LTE"), and variations of LTE such as, but not limited to, FDB/LTE and PDD/LTE.

FIG. 6 further illustrates that a pair of radio frequency ("RF") transceivers 168a, 168b that may be coupled to the digital baseband IC 126. Each RF transceiver 168a, 168b may comprise a power amplifier ("PA") 198 for communication transmissions and a low noise amplifier ("LNA") 195 for communication receptions as understood by one of ordinary skill in the art. The PA 198 may be part of a transmit chain while the LNA 195 may be part of a receive chain as understood by one of ordinary skill in the art.

Each RF transceiver 168 may operate at a unique frequency such that the pair of RF transceivers operate at different frequencies. The CP manager module may be directly coupled to the PA 198 and LNA 195 such that it may adjust the power levels of each of these hardware elements. These transceivers 168a, 168b may support DSDA communications as described above.

A pair of RF switches 170a, 170b may be coupled to the RF transceivers 168a, 168b and an RF antenna 172. As shown in FIG. 8, a keypad 174 may be coupled to the digital baseband IC 126. Also, a mono headset with a microphone 176 may be coupled to the digital baseband IC 126. Further, a vibrator device 178 may be coupled to the digital baseband IC 126. FIG. 8 also shows rechargeable power source(s) 102, for example a battery, a capacitor, and/or a combination thereof, and/or an electrical charger in combination with the battery, coupled to the on-chip system 199 through a PMIC 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157a as well as one or more external, off-chip thermal sensors 157c. The on-chip thermal sensors 157a may comprise one or more proportional to absolute temperature ("PTAT") temperature sensors that are based on vertical PNP structure and are usually dedicated to complementary metal oxide semiconductor ("CMOS") very large-scale integration ("VLSI") circuits.

The off-chip thermal sensors 157c may comprise one or more thermistors. The thermal sensors 157c may produce a voltage drop that is converted to digital signals with an analog-to-digital converter ("ADC") controller 103. However, other types of thermal sensors 157a, 157c may be employed without departing from the scope of the invention. The thermal sensors 157a, 157c, in addition to being controlled and monitored by an ADC controller 103, may also be controlled and monitored by one or more EC manager module(s).

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 199.

In a particular aspect, one or more of the method steps described herein may be implemented by executable instructions and parameters stored in the memory 113 that form the respective module(s). These instructions that form the module(s) may be executed by the CPU 110, the baseband IC 126, or another processor, in addition to the ADC controller 103 to perform the methods described herein. Further, the processors 110, 126, the memory 113, the instructions stored therein, or a combination thereof may serve as a means for performing one or more of the method steps described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or in parallel (substantially simultaneously) with other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on one or more processor-executable instructions or code on a non-transitory computer-readable medium. Non-transitory computer-readable media include both computer storage media and communication media including any medium that facilitates transfer of a computer program from one place to another. A non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing rechargeable power in a portable computing device, the method comprising:
    logically dividing a rechargeable power source in the portable computing device into a first logical power source and a second logical power source;
    assigning the first logical power source to a first usage mode;
    assigning the second logical power source to a second usage mode; and
    managing the first and second logical power sources according to the respective first and second usage modes, wherein managing the first and second logical power sources comprises budgeting a capacity of the rechargeable power source between the first and second logical power sources based on a calendar accessible to the portable computing device.

2. The method of claim 1, wherein the portable computing device comprises a multi subscriber multi active (MSMA) phone comprising a first modem associated with a first subscriber identity module (SIM) card and a second modem associated with a second SIM card, wherein the first usage mode is associated with the first SIM card and the second usage mode is associated with the second SIM card.

3. The method of claim 1, wherein managing the first and second logical power sources further comprises managing one or more of the budgeted capacity, a remaining power life forecast, a power policy, a user interface control, and a recharging of the rechargeable power source.

4. The method of claim 1, wherein the first usage mode comprises a personal usage mode and the second usage mode comprises a corporate usage mode.

5. The method of claim 4, wherein the personal and corporate usage modes are controlled by a workspace virtualization module.

6. The method of claim 1, wherein budgeting the capacity of the rechargeable power source between the first and second logical power sources further comprises calculating a target power source life for one or both of the first and second usage modes.

7. The method of claim 6, wherein the target power source life is based on an estimated power consumption associated with one or both of the first and second usage modes.

8. The method of claim 1, wherein managing the first and second logical power sources further comprises assigning the capacity of the rechargeable power source to a first logical power source capacity corresponding to the first logical power source and a second logical power source capacity corresponding to the second logical power source.

9. The method of claim 8, further comprising:
assigning power consumption of the portable computing device to the first and second usage modes; and
updating the corresponding first and second logical power source capacities based on the monitored power consumption.

10. The method of claim 9, wherein the power consumption is assigned to the first and second usage modes according to one or more of SIM card usage, application usage, one or more user settings, one or more system settings, and a location of the portable computing device.

11. The method of claim 1, further comprising logically charging the first and second logical power sources according to a priority scheme.

12. The method of claim 1, further comprising presenting on a display via a graphical user interface a power source level indicator for displaying a logical power source capacity and an available power source capacity for the first and second usage modes.

13. The method of claim 12, wherein the power source level indicator is configured to receive one or more user commands for adjusting a relative logical power source capacity or the available power source capacity for the first and second usage modes.

14. The method of claim 11, wherein the second logical power source is charged faster relative to the first logical power source.

15. The method of claim 11, wherein the second logical power source is charged before the first logical power source.

16. A portable computing device, comprising:
a rechargeable power source; and
a processor configured with processor-executable instructions to:
logically divide the rechargeable power source into a first logical power source assigned to a first usage mode and a second logical power source assigned to a second usage mode; and
manage the first and second logical power sources according to respective first and second usage modes, wherein managing the first and second logical power sources comprises budgeting a capacity of the rechargeable power source between the first and second logical power sources based on a calendar accessible to the portable computing device.

17. The portable computing device of claim 16, wherein the portable computing device comprises a multi subscriber multi active (MSMA) phone comprising a first modem associated with a first subscriber identity module (SIM) card and a second modem associated with a second SIM card, and wherein the first usage mode is associated with the first SIM card and the second usage mode is associated with the second SIM card.

18. The portable computing device of claim 16, wherein the first usage mode comprises a personal usage mode and the second usage mode comprises a corporate usage mode.

19. The portable computing device of claim 18, wherein the personal and corporate usage modes are controlled by a workspace virtualization module.

20. The portable computing device of claim 16, wherein the processor configured with processor-executable instructions to budget the capacity of the rechargeable power source between the first and second logical power sources by calculating a target power source life for one or both of the first and second usage modes.

21. The portable computing device of claim 20, wherein the target power source life is based on an estimated power consumption associated with one or both of the first and second usage modes.

22. The portable computing device of claim 16, wherein the processor configured with processor-executable instructions to manage the first and second logical power sources by assigning the capacity of the rechargeable power source to a first logical power source capacity corresponding to the first logical power source and a second logical power source capacity corresponding to the second logical power source.

23. The portable computing device of claim 22, wherein the processor is further configured with processor-executable instructions to:
assign power consumption of the portable computing device to the first and second usage modes; and
update the corresponding first and second logical power source capacities based on the monitored power consumption.

24. The portable computing device of claim 23, wherein the power consumption is assigned to the first and second usage modes according to one or more of SIM card usage, application usage, one or more user settings, one or more system settings, and a location of the portable computing device.

25. The portable computing device of claim 16, wherein the processor is further configured with processor-executable instructions to logically charge the first and second logical power sources according to a priority scheme.

26. The portable computing device of claim 16, wherein the processor is further configured with processor-executable instructions to present on the portable computing device via a graphical user interface a power source level indicator for displaying a logical power source capacity and an available power source capacity for the first and second usage modes.

27. The portable computing device of claim 26, wherein the power source level indicator is configured to receive one or more user commands for adjusting a relative logical power source capacity or the available power source capacity for the first and second usage modes.

28. The portable computing device of claim 16, wherein the processor is further configured with processor-executable instructions to manage the first and second logical power sources by managing one or more of the budgeted capacity, a remaining power life forecast, a power policy, a user interface control, and a recharging of the rechargeable power source.

29. The portable computing device of claim 25, wherein the processor is further configured with processor-executable instructions to logically charge the second logical power source faster relative to the first logical power source.

30. The portable computing device of claim 25, wherein the processor is further configured with processor-executable instructions to logically charge the second logical power source before the first logical power source.

31. A computer system for managing rechargeable power in a portable computing device, the computer system comprising:
means for logically dividing a rechargeable power source in the portable computing device into a first logical power source and a second logical power source;
means for assigning the first logical power source to a first usage mode;
means for assigning the second logical power source to a second usage mode; and means for managing the first and second logical power sources according to the respective first and second usage modes, wherein the means for managing the first and second logical power sources comprises means for budgeting a capacity of the rechargeable power source between the first and second logical power sources based on a calendar accessible to the portable computing device.

32. The computer system of claim 31, wherein the portable computing device comprises a multi subscriber multi active (MSMA) phone comprising a first modem associated with a first subscriber identity module (SIM) card and a second modem associated with a second SIM card, wherein the first usage mode is associated with the first SIM card and the second usage mode is associated with the second SIM card.

33. The computer system of claim 31, wherein the means for managing the first and second logical power sources further comprises means for managing one or more of the budgeted capacity, a remaining power life forecast, a power policy, a user interface control, and a recharging of the rechargeable power source.

34. The computer system of claim 31, wherein the first usage mode comprises a personal usage mode and the second usage mode comprises a corporate usage mode.

35. The computer system of claim 34, wherein the personal and corporate usage modes are controlled by a means for virtualizing workspaces.

36. The computer system of claim 31, wherein the means for budgeting the capacity of the rechargeable power source between the first and second logical power sources further comprises means for calculating a target power source life for one or both of the first and second usage modes.

37. The computer system of claim 36, wherein the target power source life is based on an estimated power consumption associated with one or both of the first and second usage modes.

38. The computer system of claim 31, wherein the means for managing the first and second logical power sources further comprises means for assigning the capacity of the rechargeable power source to a first logical power source capacity corresponding to the first logical power source and a second logical power source capacity corresponding to the second logical power source.

39. The computer system of claim 38, further comprising:
means for assigning power consumption of the portable computing device to the first and second usage modes; and
means for updating the corresponding first and second logical power source capacities based on the monitored power consumption.

40. The computer system of claim 39, wherein the power consumption is assigned to the first and second usage modes according to one or more of SIM card usage, application usage, one or more user settings, one or more system settings, and a location of the portable computing device.

41. The computer system of claim 31, further comprising means for logically charging the first and second logical power sources according to a priority scheme.

42. The computer system of claim 31, further comprising means for presenting on a display via a graphical user interface a power source level indicator for displaying a logical power source capacity and an available power source capacity for the first and second usage modes.

43. The computer system of claim 42, wherein the power source level indicator is configured to receive one or more user commands for adjusting a relative logical power source capacity or the available power source capacity for the first and second usage modes.

44. The computer system of claim 41, wherein the means for logically charging the first and second logical power sources according to the priority scheme further comprises means for charging the second logical power source faster relative to the first logical power source.

45. The computer system of claim 41, wherein the means for logically charging the first and second logical power sources according to the priority scheme further comprises means for charging the second logical power source before the first logical power source.

46. A non-transitory computer-readable storage medium having stored thereon processor-executable instructions configured to cause a processor of a portable computing device to perform operations comprising:
logically dividing a rechargeable power source in the portable computing device into a first logical power source and a second logical power source;
assigning the first logical power source to a first usage mode;
assigning the second logical power source to a second usage mode; and
managing the first and second logical power sources according to the respective first and second usage modes, wherein managing the first and second logical power sources comprises budgeting a capacity of the rechargeable power source between the first and second logical power sources based on a calendar accessible to the portable computing device.

47. The non-transitory computer-readable storage medium of claim 46, wherein the portable computing device comprises a multi subscriber multi active (MSMA) phone comprising a first modem associated with a first subscriber identity module (SIM) card and a second modem associated with a second SIM card, wherein the first usage mode is associated with the first SIM card and the second usage mode is associated with the second SIM card.

48. The non-transitory computer-readable storage medium of claim 46, wherein managing the first and second logical power sources further comprises managing one or more of the budgeted capacity, a remaining power life forecast, a power policy, a user interface control, and a recharging of the rechargeable power source.

49. The non-transitory computer-readable storage medium of claim 46, wherein the first usage mode comprises a personal usage mode and the second usage mode comprises a corporate usage mode.

50. The non-transitory computer-readable storage medium of claim 49, wherein the personal and corporate usage modes are controlled by a workspace virtualization module.

51. The non-transitory computer-readable storage medium of claim 46, wherein budgeting the capacity of the rechargeable power source between the first and second logical power sources further comprises calculating a target power source life for one or both of the first and second usage modes.

52. The non-transitory computer-readable storage medium of claim 51, wherein the target power source life is based on an estimated power consumption associated with one or both of the first and second usage modes.

53. The non-transitory computer-readable storage medium of claim 46, wherein managing the first and second logical power sources further comprises assigning the capacity of the rechargeable power source to a first logical power source capacity corresponding to the first logical power source and a second logical power source capacity corresponding to the second logical power source.

54. The non-transitory computer-readable storage medium of claim 53, wherein the stored processor-executable instructions are configured to cause the processor of the portable computing device to perform operations further comprising:
assigning power consumption of the portable computing device to the first and second usage modes; and
updating the corresponding first and second logical power source capacities based on the monitored power consumption.

55. The non-transitory computer-readable storage medium of claim 54, wherein the power consumption is assigned to the first and second usage modes according to one or more of SIM card usage, application usage, one or more user settings, one or more system settings, and a location of the portable computing device.

56. The non-transitory computer-readable storage medium of claim 46, wherein the stored processor-executable instructions are configured to cause the processor of the portable computing device to perform operations further comprising logically charging the first and second logical power sources according to a priority scheme.

57. The non-transitory computer-readable storage medium of claim 46, wherein the stored processor-executable instructions are configured to cause the processor of the portable computing device to perform operations further comprising presenting on a display via a graphical user interface a power source level indicator for displaying a logical power source capacity and an available power source capacity for the first and second usage modes.

58. The non-transitory computer-readable storage medium of claim 57, wherein the power source level indicator is configured to receive one or more user commands for adjusting a relative logical power source capacity or the available power source capacity for the first and second usage modes.

59. The non-transitory computer-readable storage medium of claim 56, wherein the second logical power source is charged faster relative to the first logical power source.

60. The non-transitory computer-readable storage medium of claim 56, wherein the second logical power source is charged before the first logical power source.

* * * * *